(12) United States Patent
Hill et al.

(10) Patent No.: US 12,079,006 B2
(45) Date of Patent: *Sep. 3, 2024

(54) SPATIAL DIVERSITY FOR RELATIVE POSITION TRACKING

(71) Applicant: Position Imaging, Inc., Portsmouth, NH (US)

(72) Inventors: Edward L. Hill, Conway, NH (US); Brett Bilbrey, Sunnyvale, CA (US); Harry Lee Deffebach, III, Melbourne Beach, FL (US); Krenar Komoni, Worcester, MA (US)

(73) Assignee: Position Imaging, Inc., Portsmouth, NH (US)

( * ) Notice: Subject to any disclaimer, the term of this patent is extended or adjusted under 35 U.S.C. 154(b) by 418 days.

This patent is subject to a terminal disclaimer.

(21) Appl. No.: 17/484,135

(22) Filed: Sep. 24, 2021

(65) Prior Publication Data

US 2022/0011773 A1    Jan. 13, 2022

Related U.S. Application Data

(63) Continuation-in-part of application No. 16/441,070, filed on Jun. 14, 2019, now Pat. No. 11,132,004,
(Continued)

(51) Int. Cl.
*G05D 1/02*    (2020.01)
*G01S 5/02*    (2010.01)
(Continued)

(52) U.S. Cl.
CPC ............ *G05D 1/028* (2013.01); *G01S 5/0205* (2013.01); *G01S 5/0257* (2013.01); *G01S 5/0284* (2013.01);
(Continued)

(58) Field of Classification Search
CPC .... G05D 1/028; G05D 1/0016; G05D 1/0088; G05D 1/0278; G01S 5/0205;
(Continued)

(56) References Cited

U.S. PATENT DOCUMENTS 2,408,122 A    9/1946    Wirkler
3,824,596 A    7/1974    Guion et al.
(Continued)

FOREIGN PATENT DOCUMENTS

WO    2001006401 A1    1/2001
WO    2005010550 A1    2/2005

OTHER PUBLICATIONS

Final Office Action in U.S. Appl. No. 15/041,405 mailed on Mar. 19, 2019; 27 pages.
(Continued)

*Primary Examiner* — Calvin Cheung
(74) *Attorney, Agent, or Firm* — Schmeiser, Olsen & Watts LLP

(57) ABSTRACT

A network comprises a network apparatus constructed and arranged for each of a plurality of vehicles in radio frequency (RF) communication with each other, the network apparatus comprising: at least one first transceiver; at least one second transceiver configured to exchange RF signals with the at least one first transceiver; receiver circuitry configured to determine timing information from the acquired RF signals; memory storing information related to fixed distances between the at least one first transceiver and the at least one second transceiver; a processor coupled to the memory to access the stored information related to the fixed distances, and to the receiver circuitry to receive the timing information determined from the RF signals, the processor being configured to determine a relative position of the vehicle with respect to a receipt of the RF signals
(Continued)

based on the stored information related to the fixed distances between each of at least three spatially separated antenna and on the timing information determined by the receiver circuitry; and a control system configured to control operation of the vehicle in response to the relative position of the vehicle, determined by the processor.

19 Claims, 7 Drawing Sheets

Related U.S. Application Data which is a continuation of application No. 15/404,668, filed on Jan. 12, 2017, now Pat. No. 10,324,474, which is a continuation-in-part of application No. 15/041,405, filed on Feb. 11, 2016, now Pat. No. 10,642,560.

(60) Provisional application No. 62/115,954, filed on Feb. 13, 2015.

(51) Int. Cl.
  *G01S 5/14* (2006.01)
  *G02B 27/01* (2006.01)
  *G05D 1/00* (2006.01)
  *G01S 5/00* (2006.01)
  *G01S 5/10* (2006.01)
  *G01S 19/48* (2010.01)
  *G06F 3/147* (2006.01)

(52) U.S. Cl.
  CPC .............. *G01S 5/14* (2013.01); *G02B 27/017* (2013.01); *G05D 1/0016* (2013.01); *G05D 1/0088* (2013.01); *G05D 1/0278* (2013.01); *G01S 5/0072* (2013.01); *G01S 5/10* (2013.01); *G01S 19/48* (2013.01); *G02B 2027/0178* (2013.01); *G06F 3/147* (2013.01); *G09G 2370/16* (2013.01)

(58) Field of Classification Search
  CPC ........ G01S 5/0257; G01S 5/0284; G01S 5/14; G01S 5/0072; G01S 5/10; G01S 19/48; G01S 1/042; G01S 13/878; G02B 27/017; G02B 2027/0178; G02B 2027/0187; G06F 3/147; G09G 2370/16
  See application file for complete search history.

(56) References Cited

U.S. PATENT DOCUMENTS

| | | |
|---|---|---|
| 3,940,700 A | 2/1976 | Fischer |
| 4,328,499 A | 5/1982 | Anderson et al. |
| 5,010,343 A | 4/1991 | Andersson |
| 5,343,212 A | 8/1994 | Rose et al. |
| 5,426,438 A | 6/1995 | Peavey et al. |
| 5,510,800 A | 4/1996 | McEwan |
| 5,574,468 A | 11/1996 | Rose |
| 5,592,180 A | 1/1997 | Yokev et al. |
| 5,600,330 A | 2/1997 | Blood |
| 5,657,026 A | 8/1997 | Culpepper et al. |
| 5,923,286 A | 7/1999 | Divakaruni |
| 5,953,683 A | 9/1999 | Hansen et al. |
| 6,088,653 A | 7/2000 | Sheikh et al. |
| 6,101,178 A | 8/2000 | Beal |
| 6,167,347 A | 12/2000 | Lin |
| 6,255,991 B1 | 7/2001 | Hedin |
| 6,292,750 B1 | 9/2001 | Lin |
| 6,409,687 B1 | 6/2002 | Foxlin |
| 6,412,748 B1 | 7/2002 | Girard |
| 6,417,802 B1 | 7/2002 | Diesel |
| 6,496,778 B1 | 12/2002 | Lin |
| 6,512,748 B1 | 1/2003 | Mizuki et al. |
| 6,522,890 B2 | 2/2003 | Drane et al. |
| 6,593,885 B2 | 7/2003 | Wisherd et al. |
| 6,630,904 B2 | 10/2003 | Gustafson et al. |
| 6,683,568 B1 | 1/2004 | James et al. |
| 6,697,736 B2 | 2/2004 | Lin |
| 6,720,920 B2 | 4/2004 | Breed et al. |
| 6,721,657 B2 | 4/2004 | Ford et al. |
| 6,744,436 B1 | 6/2004 | Chirieleison, Jr. et al. |
| 6,750,816 B1 | 6/2004 | Kunysz |
| 6,861,982 B2 | 3/2005 | Forstrom et al. |
| 6,867,774 B1 | 3/2005 | Halmshaw et al. |
| 6,989,789 B2 | 1/2006 | Ferreol et al. |
| 7,009,561 B2 | 3/2006 | Menache et al. |
| 7,143,004 B2 | 11/2006 | Townsend et al. |
| 7,168,618 B2 | 1/2007 | Schwartz |
| 7,190,309 B2 | 3/2007 | Hill |
| 7,193,559 B2 | 3/2007 | Ford et al. |
| 7,236,091 B2 | 6/2007 | Kiang et al. |
| 7,236,092 B1 | 6/2007 | Joy |
| 7,292,189 B2 | 11/2007 | Orr et al. |
| 7,295,925 B2 | 11/2007 | Breed et al. |
| 7,315,281 B2 | 1/2008 | Dejanovic et al. |
| 7,336,078 B1 | 2/2008 | Merewether et al. |
| 7,409,290 B2 | 8/2008 | Lin |
| 7,443,342 B2 | 10/2008 | Shirai et al. |
| 7,499,711 B2 | 3/2009 | Hoctor et al. |
| 7,533,569 B2 | 5/2009 | Sheynblat |
| 7,612,715 B2 | 11/2009 | Macleod |
| 7,646,330 B2 | 1/2010 | Karr |
| 7,868,760 B2 | 1/2011 | Smith et al. |
| 7,876,268 B2 | 1/2011 | Jacobs |
| 7,933,730 B2 | 4/2011 | Li et al. |
| 8,269,624 B2 | 9/2012 | Chen et al. |
| 8,457,655 B2 | 6/2013 | Zhang et al. |
| 8,749,433 B2 | 6/2014 | Hill |
| 8,860,611 B1 | 10/2014 | Anderson et al. |
| 8,957,812 B1 | 2/2015 | Hill et al. |
| 9,063,215 B2 | 6/2015 | Perthold et al. |
| 9,092,898 B1 | 7/2015 | Fraccaroli et al. |
| 9,120,621 B1 | 9/2015 | Curlander et al. |
| 9,141,194 B1 | 9/2015 | Keyes et al. |
| 9,174,746 B1 | 11/2015 | Bell et al. |
| 9,337,889 B1 | 5/2016 | Stapleford |
| 9,482,741 B1 | 11/2016 | Min et al. |
| 9,497,728 B2 | 11/2016 | Hill |
| 9,519,344 B1 | 12/2016 | Hill |
| 9,529,360 B1 | 12/2016 | Melamed et al. |
| 9,767,699 B1 | 9/2017 | Borghese et al. |
| 9,782,669 B1 | 10/2017 | Hill |
| 9,813,659 B1 | 11/2017 | Tholen et al. |
| 9,872,151 B1 | 1/2018 | Puzanov et al. |
| 9,933,509 B2 | 4/2018 | Hill et al. |
| 9,961,503 B2 | 5/2018 | Hill |
| 10,001,833 B2 | 6/2018 | Hill |
| 10,148,918 B1 | 12/2018 | Seiger et al. |
| 10,180,490 B1 | 1/2019 | Schneider et al. |
| 10,257,654 B2 | 4/2019 | Hill |
| 10,853,757 B1 | 12/2020 | Hill et al. |
| 2002/0021277 A1 | 2/2002 | Kramer et al. |
| 2002/0140745 A1 | 10/2002 | Ellenby et al. |
| 2002/0177476 A1 | 11/2002 | Chou |
| 2003/0053492 A1 | 3/2003 | Matsunaga |
| 2003/0120425 A1 | 6/2003 | Stanley et al. |
| 2003/0146871 A1 | 8/2003 | Karr et al. |
| 2003/0176196 A1 | 9/2003 | Hall et al. |
| 2003/0195017 A1 | 10/2003 | Chen et al. |
| 2004/0095907 A1 | 5/2004 | Agee et al. |
| 2004/0107072 A1 | 6/2004 | Dietrich et al. |
| 2004/0132461 A1 | 7/2004 | Duncan |
| 2004/0176102 A1 | 9/2004 | Lawrence et al. |
| 2004/0203846 A1 | 10/2004 | Caronni et al. |
| 2005/0001712 A1 | 1/2005 | Yarbrough |
| 2005/0057647 A1 | 3/2005 | Nowak |
| 2005/0143916 A1 | 6/2005 | Kim et al. |
| 2005/0184907 A1 | 8/2005 | Hall et al. |
| 2005/0275626 A1 | 12/2005 | Mueller et al. |
| 2006/0013070 A1 | 1/2006 | Holm et al. |

(56) References Cited

U.S. PATENT DOCUMENTS

| | | |
|---|---|---|
| 2006/0022800 A1 | 2/2006 | Krishna et al. |
| 2006/0061469 A1 | 3/2006 | Jaeger et al. |
| 2006/0066485 A1 | 3/2006 | Min |
| 2006/0101497 A1 | 5/2006 | Hirt et al. |
| 2006/0192709 A1 | 8/2006 | Schantz et al. |
| 2006/0279459 A1 | 12/2006 | Akiyama et al. |
| 2006/0290508 A1 | 12/2006 | Moutchkaev et al. |
| 2007/0060384 A1 | 3/2007 | Dohta |
| 2007/0138270 A1 | 6/2007 | Reblin |
| 2007/0205867 A1 | 9/2007 | Kennedy et al. |
| 2007/0210920 A1 | 9/2007 | Panotopoulos |
| 2007/0222560 A1 | 9/2007 | Posamentier |
| 2008/0007398 A1 | 1/2008 | DeRose et al. |
| 2008/0048913 A1 | 2/2008 | Macias et al. |
| 2008/0143482 A1 | 6/2008 | Shoarinejad et al. |
| 2008/0150678 A1 | 6/2008 | Giobbi et al. |
| 2008/0154691 A1 | 6/2008 | Wellman et al. |
| 2008/0174485 A1 | 7/2008 | Carani et al. |
| 2008/0204322 A1 | 8/2008 | Oswald et al. |
| 2008/0266253 A1 | 10/2008 | Seeman et al. |
| 2008/0281618 A1 | 11/2008 | Mermet et al. |
| 2008/0316324 A1 | 12/2008 | Rofougaran et al. |
| 2009/0043504 A1 | 2/2009 | Bandyopadhyay et al. |
| 2009/0149202 A1 | 6/2009 | Hill et al. |
| 2009/0224040 A1 | 9/2009 | Kushida et al. |
| 2009/0243932 A1 | 10/2009 | Moshfeghi |
| 2009/0323586 A1 | 12/2009 | Hohl et al. |
| 2010/0090852 A1 | 4/2010 | Eitan et al. |
| 2010/0097208 A1 | 4/2010 | Rosing et al. |
| 2010/0103173 A1 | 4/2010 | Lee et al. |
| 2010/0103989 A1 | 4/2010 | Smith et al. |
| 2010/0123664 A1 | 5/2010 | Shin et al. |
| 2010/0159958 A1 | 6/2010 | Naguib et al. |
| 2011/0006774 A1 | 1/2011 | Baiden |
| 2011/0037573 A1 | 2/2011 | Choi |
| 2011/0187600 A1 | 8/2011 | Landt |
| 2011/0208481 A1 | 8/2011 | Slastion |
| 2011/0210843 A1 | 9/2011 | Kummetz |
| 2011/0241942 A1 | 10/2011 | Hill |
| 2011/0256882 A1 | 10/2011 | Markhovsky et al. |
| 2011/0264520 A1 | 10/2011 | Puhakka |
| 2012/0013509 A1 | 1/2012 | Wisherd et al. |
| 2012/0127088 A1 | 5/2012 | Pance et al. |
| 2012/0176227 A1 | 7/2012 | Nikitin |
| 2012/0184285 A1 | 7/2012 | Sampath et al. |
| 2012/0286933 A1 | 11/2012 | Hsiao |
| 2012/0319822 A1 | 12/2012 | Hansen |
| 2013/0018582 A1 | 1/2013 | Miller et al. |
| 2013/0021417 A1 | 1/2013 | Ota et al. |
| 2013/0029685 A1 | 1/2013 | Moshfeghi |
| 2013/0036043 A1 | 2/2013 | Faith |
| 2013/0113993 A1 | 5/2013 | Dagit, III |
| 2013/0281084 A1 | 10/2013 | Batada et al. |
| 2013/0314210 A1 | 11/2013 | Schoner et al. |
| 2014/0022058 A1 | 1/2014 | Striemer et al. |
| 2014/0253368 A1 | 9/2014 | Holder |
| 2014/0300516 A1 | 10/2014 | Min et al. |
| 2014/0324291 A1 | 10/2014 | Jones et al. |
| 2014/0361078 A1 | 12/2014 | Davidson |
| 2015/0009949 A1 | 1/2015 | Khoryaev et al. |
| 2015/0039458 A1 | 2/2015 | Reid |
| 2015/0091757 A1 | 4/2015 | Shaw et al. |
| 2015/0130664 A1 | 5/2015 | Hill et al. |
| 2015/0134418 A1 | 5/2015 | Leow et al. |
| 2015/0169916 A1 | 6/2015 | Hill et al. |
| 2015/0221135 A1 | 8/2015 | Hill et al. |
| 2015/0323643 A1 | 11/2015 | Hill et al. |
| 2015/0340759 A1 | 11/2015 | Bridgelall et al. |
| 2015/0362581 A1 | 12/2015 | Friedman et al. |
| 2015/0379366 A1 | 12/2015 | Nomura et al. |
| 2016/0142868 A1 | 5/2016 | Kulkarni et al. |
| 2016/0150196 A1 | 5/2016 | Horvath |
| 2016/0156409 A1 | 6/2016 | Chang |
| 2016/0178727 A1 | 6/2016 | Bottazzi |
| 2016/0238692 A1 | 8/2016 | Hill et al. |
| 2016/0256100 A1 | 9/2016 | Jacofsky et al. |
| 2016/0286508 A1 | 9/2016 | Khoryaev et al. |
| 2016/0307384 A1 | 10/2016 | Sampei |
| 2016/0366561 A1 | 12/2016 | Min et al. |
| 2016/0370453 A1 | 12/2016 | Boker et al. |
| 2016/0371574 A1 | 12/2016 | Nguyen et al. |
| 2017/0030995 A1 | 2/2017 | Khong et al. |
| 2017/0030997 A1 | 2/2017 | Hill et al. |
| 2017/0031432 A1 | 2/2017 | Hill |
| 2017/0123426 A1 | 5/2017 | Hill et al. |
| 2017/0234979 A1 | 8/2017 | Mathews et al. |
| 2017/0261592 A1 | 9/2017 | Min et al. |
| 2017/0280281 A1 | 9/2017 | Pandey et al. |
| 2017/0323174 A1 | 11/2017 | Joshi et al. |
| 2017/0350961 A1 | 12/2017 | Hill et al. |
| 2017/0372524 A1 | 12/2017 | Hill |
| 2018/0068266 A1 | 3/2018 | Kirmani et al. |
| 2018/0164103 A1 | 6/2018 | Hill |
| 2018/0197139 A1 | 7/2018 | Hill |
| 2018/0231649 A1 | 8/2018 | Min et al. |
| 2018/0242111 A1 | 8/2018 | Hill |
| 2018/0324744 A1 | 11/2018 | Patel et al. |
| 2019/0090744 A1 | 3/2019 | Mahfouz |
| 2019/0098263 A1 | 3/2019 | Seiger et al. |
| 2019/0164442 A1 | 5/2019 | Just |
| 2019/0324114 A1 | 10/2019 | Schneider et al. |

OTHER PUBLICATIONS

Dictionary definition for peripheral equipment. (2001). Hargrave's Communications Dictionary, Wiley, Hoboken, NJ: Received from https://search.credoreference.com/content/entry/hargravecomms/peripheral_equipment/0 (Year: 2001).

Notice of Allowance in U.S. Appl. No. 15/041,405 mailed on Jan. 23, 2020.

Notice of Allowance in U.S. Appl. No. 16/441,070 mailed on May 19, 2021.

Ex Parte Quayle Action in U.S. Appl. No. 16/441,070 mailed on Mar. 8, 2021.

Wilde, Andreas, "Extended Tracking Range Delay-Locked Loop," Proceedings IEEE International Conference on Communications, Jun. 1995, pp. 1051-1054.

Li, Xin, et al. "Multifrequency-Based Range Estimation of RFID Tags," 2009, IEEE.

Sun, Debo "Ultra-Tight GPS/Reduced IMU for Land Vehicle Navigation", Mar. 2010, UCGE Reports No. 20305; 254 pages.

Alban, Santiago "Design and Performance of a Robust GPS/INS Attitude System for Automobile Applications", Dissertation, Stanford University, Jun. 2004; 218 pages.

Farrell and Barth, "The Global Positioning System & Interial Navigation", 1999, McGraw-Hill; pp. 245-252.

Farrell, et al. "Real-Time Differential Carrier Phase GPS-Aided INS", Jul. 2000, IEEE Transactions on Control Systems Technology, vol. 8, No. 4; 13 pages.

Filho, et al. "Integrated GPS/INS Navigation System Based on a Gyroscope-Free IMU", DINCON Brazilian Conference on Synamics, Control, and Their Applications, May 22-26, 2006; 6 pages.

Gao, Jianchen "Development of a Precise GPS/INS/On-Board Vehicle Sensors Integrated Vehicular Positioning System", Jun. 2007, UCGE Reports No. 20555; 245 pages.

Gautier, Jennifer Denise "GPS/INS Generalized Evaluation Tool (GIGET) for the Design and Testing of Integrated Navigation Systems", Dissertation, Stanford University, Jun. 2003; 160 pages.

Goodall, Christopher L., "Improving Usability of Low-Cost INS/GPS Navigation Systems using Intelligent Techniques", Jan. 2009, UCGE Reports No. 20276; 234 pages.

Grewal and Andrews "Global Positioning Systems, Inertial Navigation, and Integration" Section 8.6-8.6.3.1, 2001, John Weiley and Sons, pp. 252-256.

Hill, et al. "Package Tracking Systems and Methods," U.S. Appl. No. 15/091,180, filed Apr. 5, 2016.

Restriction Requirement in U.S. Appl. No. 15/041,405 mailed on Sep. 25, 2018.

(56) References Cited

OTHER PUBLICATIONS

Piotrowski, et al. "Light-Based Guidance for Package Tracking Systems," U.S. Appl. No. 15/416,379, filed Jan. 26, 2017.

Pourhomayoun, Mohammad and Mark Fowler "Improving WLAN-based Indoor Mobile Positioning Using Sparsity," Conference Record of the Forty Sixth Asilomar Conference on Signals, Systems and Computers, Nov. 4-7, 2012, pp. 1393-1396, Pacific Grove, California.

Proakis, John G. and Masoud Salehi, "Communication Systems Engineering", Second Edition, Prentice-Hall, Inc., Upper Saddle River, New Jersey, 2002; 815 pages.

Schmidt and Phillips, "INS/GPS Integration Architectures", NATO RTO Lecture Seriers, First Presented Oct. 20-21, 2003; 24 pages.

Schumacher, Adrian "Integration of a GPS aided Strapdown Inertial Navigation System for Land Vehicles", Master of Science Thesis, KTH Electrical Engineering, 2006; 67 pages.

Sun, et al., "Analysis of the Kalman Filter With Different INS Error Models for GPS/INS Integration in Aerial Remote Sensing Applications", Bejing, 2008, The International Archives of the Photogrammerty, Remote Sensing and Spatial Information Sciences vol. XXXVII, Part B5.; 8 pages.

Vikas Numar N. "Integration of Inertial Navigation System and Global Positioning System Using Kalman Filtering", M.Tech Dissertation, Indian Institute of Technology, Bombay, Mumbai, Jul. 2004; 69 pages.

Welch, Greg and Gary Bishop "An Introduction to the Kalman Filter, TR95-041," Department of Computer Science, University of North Carolina at Chapel Hill, Chapel Hill, NC 27599-3175, Updated: Monday, Jul. 24, 2006.

Yang, Yong "Tightly Coupled Mems INS/GPS Integration with INS Aided Receiver Tracking Loops", Jun. 2008, UCGE Reports No. 20270; 205 pages.

"ADXL202/ADXL210 Product Sheet", Analog Devices, Inc., Analog.com, 1999.

Notice of Allowance in U.S. Appl. No. 15/404,668 mailed on Feb. 19, 2019; 6 pages.

Notice of Allowance in U.S. Appl. No. 15/404,668 mailed on Sep. 7, 2018; 5 pages.

Notice of Allowance in U.S. Appl. No. 15/404,668 mailed on May 15, 2018.

Notice of Allowance in U.S. Appl. No. 15/404,668 mailed on Feb. 14, 2018.

Morbella N50: 5-inch GPS Navigator User's Manual, Maka Technologies Group, May 2012.

Non-Final Office Action in U.S. Appl. No. 15/041,405 mailed on Sep. 6, 2019; 28 pages.

Non-Final Office Action in U.S. Appl. No. 15/041,405 mailed on Nov. 19, 2018.

International Search Report and Written Opinion in PCT/US22/43944 mailed on Feb. 1, 2023.

International Preliminary Report on Patentability in PCT/US2022/043944 mailed on Apr. 4, 2024.

International Search Report and Written Opinion in PCT/US2012/064860 mailed on Feb. 28, 2013.

SPATIAL DIVERSITY FOR RELATIVE POSITION TRACKING

RELATED APPLICATIONS

This application is a continuation-in-part of U.S. application Ser. No. 16/441,070, filed Jun. 14, 2019, titled "Spatial Diversity for Relative Position Tracking, which is a continuation of co-pending U.S. application Ser. No. 15/404,668, issued as U.S. Pat. No. 10,324,474 and filed Jan. 12, 2017, titled "Spatial Diversity for Relative Position Tracking," which is a continuation-in-part of U.S. application Ser. No. 15/041,405, issued as U.S. Pat. No. 10,642,560 and filed Feb. 11, 2016, titled "Accurate Geographic Tracking of Mobile Devices", which claims the benefit of and priority to U.S. provisional application No. 62/115,954, filed Feb. 13, 2015, titled "Utilizing Radio Frequency Signals Transmitted by Stationary or Mobile Devices for Accurate and Geographically Broad Tracking of Mobile Devices in the Real World, Augmented Reality or Virtual Reality," the entireties of which non-provisional and provisional applications are incorporated by reference herein.

FIELD OF THE INVENTION

The invention relates generally to position tracking systems and methods, for use by vehicles.

BACKGROUND

Determining the position of an electronic device or object has been a subject of much research since the emergence of RADAR and SONAR. A variety of proximity and position detection schemes exists today. For example, the Global Positioning System (GPS) has been transformational to military and civilian users by providing a system of orbiting satellites that have highly synchronized clocks emitting timing information continuously. A GPS receiver obtaining signals from three satellites can triangulate its position with time of receipt information. This triangulation is accurate to meters and is highly suitable for use in navigation for oceanic ships, cars or when walking. However, GPS signals do not provide accuracy to five inches or less as would be desirable in a Virtual Reality (VR) and Augmented Reality (AR) systems. VR technologies simulate an environment and typically provide a view of this environment on a head mounted display (HMD) which may also provide headphones with synthesized sound. AR technologies provide images which are partially of actual object with synthesized computer generated images superimposed upon it. VR and AR technologies are described in U.S. patent application Ser. No. 13/967,058, filed Aug. 14, 2013, and Ser. No. 14/614,734, filed Feb. 5, 2015, owned by the owner of the this application, and are hereby incorporated by reference as if set forth in their entirety herein.

GPS systems do not work as well indoors. Many indoor tracking systems have been proposed. Apple iBeacons, for example, use Bluetooth Low Energy (BLE) transceivers to transmit beacon identification (and other) information and the location of a receiver from the iBeacon is calculated based on Received Signal Strength Indicator (RSSI). Such a system is a proximity indicator, and does not provide a high level of location accuracy necessary in many modern applications. There have been other attempts at accurate indoor wireless positioning systems, including for example the IEEE paper "Improving WLAN-Based Indoor Mobile Positioning Using Sparsity", by Pourhomayoun and Fowler (2012). However, to date, such systems have accuracy of about a meter, which is not adequate for real time tracking of position in many applications.

The above tracking systems have multiple uses in gross position determination. However, more recently, the need has arisen for precise location and tracking of objects or devices, both indoors and outdoors. Wireless tracking is described more fully in U.S. patent application Ser. No. 14/600,025, filed Jan. 20, 2015, and Ser. No. 14/354,833, filed Apr. 28, 2014, owned by the owner of the this application and are hereby incorporated by reference as if set forth in their entirety in this application. For example, VR and AR technologies are starting to emerge as viable interactive means of communicating, working, playing, and exploring with the digital world. To make these new AR and VR systems more effective, the need for improved accuracy and faster response in these systems increases. These improved systems must contemplate the user experience from the moment they begin interacting with the AR/VR system, through its use and return to a disconnected world. Such an immersive experience requires precise real time tracking of the user for a realistic experience.

U.S. Pat. No. 8,749,433, issued Jun. 10, 2014, discusses a system for tracking an RF transmitter. If attached to an object, tracking this RF transmitter will also track the attached object.

This type of tracking has been integrated into a virtual reality system as discussed in U.S. patent application Ser. No. 14/614,734, filed Feb. 5, 2015, owned by the owner of this application, and hereby incorporated by reference in its entirety herein. In such a system, a transmitter transmits its location, and multiple receiver antennae and a controller use time difference of arrival (TDOA) to determine the position of the transmitting device. This allows the tracking to be precise; however, if only one transmitter is utilized, then only one transmitter (point) may be tracked.

Another technique for internal tracking of objects is described in the paper "*Multifrequency-Based Range Estimation of RFID Tags*" (2009, IEEE, by Xin Li). In this paper, multiple frequencies are compared using a phase difference of arrival (PDOA) to locate or track objects. The radio frequency identification (RFID) tags employed with the present system include a means for transmitting and receiving RF signals, a processor, memory which may include executable code and possibly sensors. The RFID tag can then execute a program and function as described herein.

In this technique, multiple frequencies are transmitted to an RFID, which retransmits the frequencies as is known to those skilled in the art. The returned signal can be used to calculate the distance from the transmitter to the RFID. However, analysis of the returned signal only provides a distance measurement from the transmitter to the RFID tag. Several tags must be used to determine directionality.

Of particular interest in AR and VR are virtual reality glasses and/or head mounted displays ("HMDs"). As HMDs become more prevalent, new functionality to enable better engagement with and connection to the virtual world become critical.

There are a variety of approaches that attempt to provide an intuitive interface for controlling content shown on these devices—as is critical to the effectiveness of how HMDs are used. As most of these HMDs will be wireless and mobile, operated away from desks or related environments where computer mouse or trackpads are accessible, there needs to be an effective solution for providing input control without requiring a typical input device. Cameras can be installed on the HMDs to track a person's hand gestures and these gestures can then be used for interaction. But, in these camera-based systems, gesture tracking can be limited by the field of view of the camera, accuracy of the camera gesture tracking, range detection of the hand position as viewed by HMD cameras, or the lack of tactile input to the hand or fingers as they are interacting with the program running on the HMD.

Most VR/AR systems require recalibration of the tracking system when the number of tracked objects changes. This make the systems difficult to properly configure and impractical for certain uses.

The geographic area in which objects may be tracked is typically limited. The objects must be within the transmission range of the transmitters. Once the objects are outside of this area, they can no longer be tracked.

Some prior art tracking systems require significant RF transmission that require significant energy to operate. If a user would like to continuously track objects, then the amount of power dissipation becomes significant. This power dissipation reduces battery life.

Barcode readers and mobile scanners are described in U.S. patent application Ser. No. 14/568,468 filed Dec. 12, 2014 which is owned by the owner of this application and hereby incorporated by reference as if set forth in its entirety herein.

While the above systems for tracking are useful, they do not provide a suitable method of tracking objects with precision and in real time. Furthermore, they do not address real time tracking of multiple objects in a coordinated way as would be required in an AR or VR environment. Currently there is a need for highly accurate and low power tracking systems for indoor and outdoor tracking of multiple points on multiple objects.

SUMMARY

All examples and features mentioned below can be combined in any technically possible way.

In one aspect, a vehicle comprises at least three spatially separated receiver antennae configured to receive radio frequency (RF) signals from one or more RF-transmitting antennae coupled to an object. Receiver circuitry coupled to the at least three spatially separated receiver antennae is configured to acquire the RF signals received by the at least three spatially separated receiver antennae and to determine timing information from the acquired RF signals. Memory storing information related to fixed distances between each receiver antenna and each other receiver antenna of the at least three spatially separated receiver antennae. A processor is coupled to the memory to access the stored information related to the fixed distances between each receiver antenna and each other receiver antenna of the at least three spatially separated receiver antennae, and to the receiver circuitry to receive the timing information determined from the RF signals received by the at least three spatially separated receiver antennae. The processor is configured to determine a relative position of the vehicle with respect to the one or more RF-transmitting antennae based on the stored information related to the fixed distances between each receiver antenna and each other receiver antenna of the at least three spatially separated receiver antennae and on the timing information determined by the receiver circuitry. A control system is configured to control operation of the vehicle in response to the relative position of the vehicle with respect to the one or more RF-transmitting antennae determined by the processor.

In another aspect, a network comprises a network apparatus constructed and arranged for each of a plurality of vehicles in radio frequency (RF) communication with each other, the network apparatus comprising: at least one transceiver configured to exchange RF signals with another transmitting or receiving device and to determine timing information from the acquired RF signals; memory storing information related to fixed distances between the at least one first transceiver and the other transmitting or receiving device; a processor coupled to the memory to access the stored information related to the fixed distances, and to receiver circuitry of the at least one transceiver to receive the timing information determined from the RF signals, the processor being configured to determine a relative position of the vehicle with respect to a receipt of the RF signals based on the stored information related to the fixed distances between each of a plurality of spatially separated antenna and on the timing information determined by the receiver circuitry; and a control system configured to control operation of the vehicle in response to the relative position of the vehicle, determined by the processor.

The vehicle can be terrestrial, aerial, or aquatic, such as an automobile, truck, train, bicycle, airplane, drone, boat, spacecraft, or robot. The vehicle can be manned or unmanned, driver-assisted or autonomously driven. The object can be another vehicle or a moving or stationary object.

In another aspect, a method of controlling a vehicle comprises transmitting radio frequency (RF) signals by at least one first transceiver; receiving, by a plurality of separated receiver antennae coupled to the vehicle, RF signals from at least one second transceiver coupled to an object; determining timing information from the received RF signals; storing information related to fixed distances between the least one first transceiver and the at least one second transceiver; determining a relative position of the vehicle with respect to the at least one second transceiver coupled to the object based on the stored information related to the fixed distances between each of a plurality of spatially separated antenna and on the determined timing information; and controlling operation of the vehicle in response to the determined relative position of the vehicle.

In another embodiment, a network comprises a network apparatus constructed and arranged for each of a plurality of vehicles in radio frequency (RF) communication with each other, the network apparatus comprising: at least one first transceiver; at least one second transceiver configured to exchange RF signals with the at least one first transceiver; receiver circuitry configured to determine timing information from the acquired RF signals; memory storing information related to fixed distances between the at least one first transceiver and the at least one second transceiver; a processor coupled to the memory to access the stored information related to the fixed distances, and to the receiver circuitry to receive the timing information determined from the RF signals, the processor being configured to determine a relative position of the vehicle with respect to a receipt of the RF signals based on the stored information related to the fixed distances between each of at least three spatially separated antenna and on the timing information determined by the receiver circuitry; and a control system configured to control operation of the vehicle in response to the relative position of the vehicle, determined by the processor.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

Figure 1:
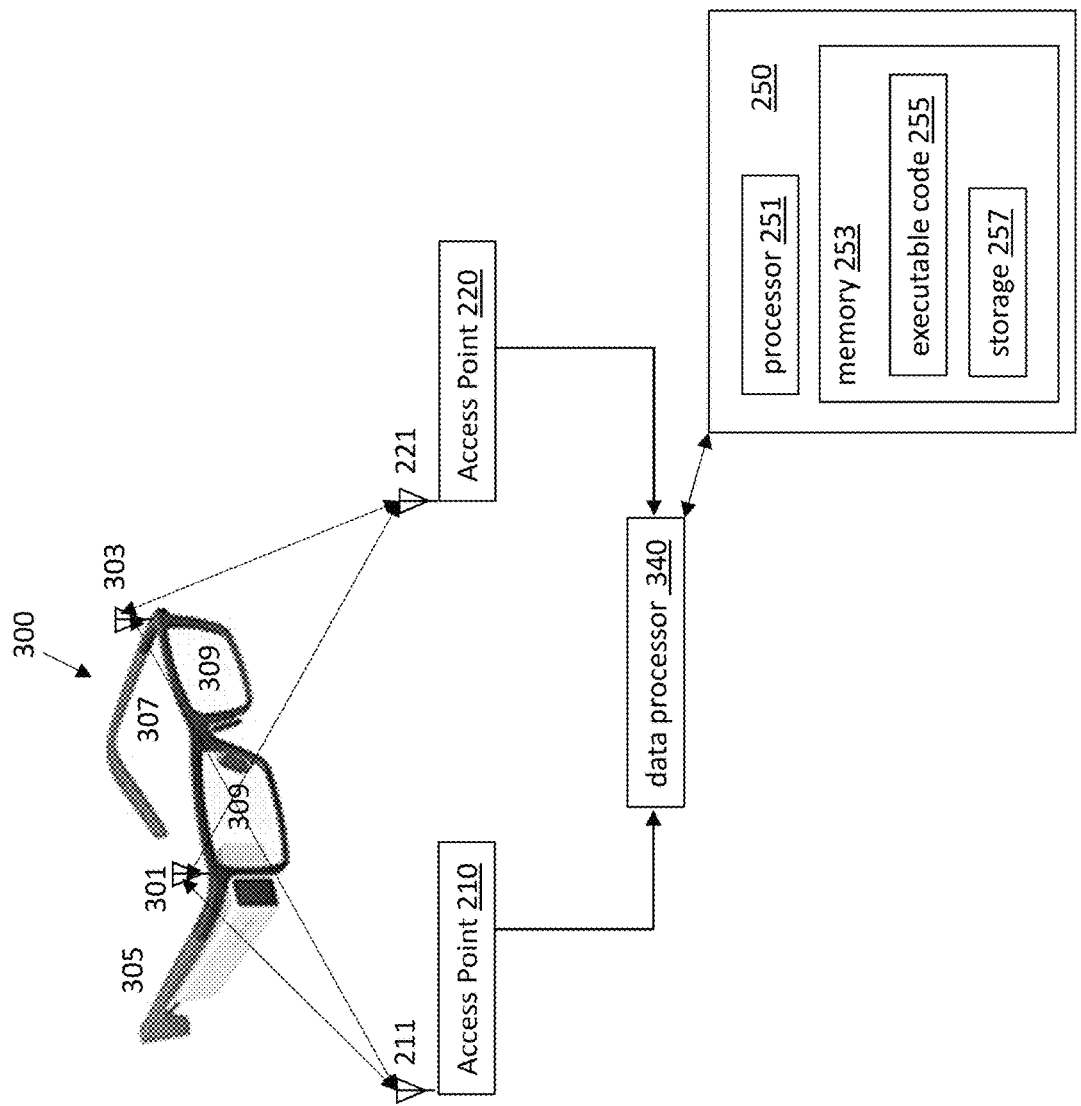
FIG. 1 is a schematic illustration of an embodiment of a head-mounted display (HMD) being tracked by a tracking system.

An accurate and intuitive approach for interfacing with devices having RF capabilities, such as HMDs, mobile devices and the like, without camera gesture tracking, can enable new use cases and more effective control of content shown on these devices. As most HMDs will have radio communication capabilities, a means to leverage this functionality to enable interaction is helpful and economical. A method to enable HMDs to use their basic radio communication to accurately track their own position as well as the position of input devices in free space can enable better interaction as well as reduce costs.

The HMD would have two or more antennae embedded in or mounted to the HMD. A multifrequency transmitter, such as an Access Point, provides two or more frequency signals to the two or more HMD antennae. The HMD uses these two signals as received at each antenna to identify the range between the antenna and the Access Point. Then, using both (for two HMD antennae) ranges from either one or more Access Points with known position coordinates and the heading and orientation as supplied by inertial sensors in the HMD, the HMD can determine accurate position information.

Position can be further defined and accuracies improved using RF signals from additional Access Points, transmitters sending location information, motion sensors (including GPS, magnetic, accelerometer, gyroscope) or other position and/or orientation information sources.

The present disclosure also provides the ability for an HMD to accurately track the relative three-dimensional position of a wireless transmitting device such as an RFID device, or such as a phone, ring, wristband, stylus, handheld pointer, or related interactive peripheral device, ("Tag"), using the same multifrequency transmitting method described above for Access Points communicating range to the HMD. This relative position tracking would provide a flexible and intuitive approach for HMD interaction. Tags could become intuitive, interactive peripherals for HMDs and provide a unique and effective means to engage with programs displayed on the device without requiring a mouse, trackpad, camera, or related input solution.

HMDs can track the position of a Tag and use the position data to engage with a software program running or displayed on the device. In these applications, the Tag position and movement would be registered with screen images provided by software and shown on the HMD. To make this Tag's operation effective for a user (to control a cursor on a screen for example), very high position accuracies are required to provide realistic interaction between the user operating the Tag and the software program shown on the HMD. Herein is described a method that can provide said tracking capability for the HMD to meet the accuracy and cost requirements of these devices but also work with hardware constraints inherent in the size and ergonomic restrictions of HMDs.

One embodiment includes a system that allows Mobile Devices such as augmented or virtual reality glasses, robots, drones, handheld communicators (mobile phones) or scanners, or any mobile peripheral (Mobile Device) with radio frequency (RF) communication capability and multiple antennae embedded or attached to the mobile device, to track other devices that emit electromagnetic or RF signals (Other Devices) relative position to the Mobile Device. Further, when multiple Mobile Devices are present, each can calculate and communicate its own position relative to other devices, and the web of devices can provide a means for more efficiently and accurately tracking other devices. In addition, the Mobile Device may determine its actual outdoor or indoor position by utilizing certain stationary devices (Access Points) with RF communication capability and the ability to provide the Mobile Device with the Access Point's two or three-dimensional position coordinates. This position can then be relayed to other Mobile Devices or to a tracking center in certain use cases.

Basic Tracking

FIG. 1 shows a tracking system 100 for tracking a mobile object, such as a mobile display or a head mounted display device (HMD) 300 that has a display 309 for each of the user's eyes that is generated by a, and two or more antennae 301, 303, attached to, or embedded in said HMD 300. The antennae 301, 303 are designed to be a known, fixed distance apart, and a known fixed distance from each of the displays 309. The HMD 300 may employ side arms 305, 307, like those of eyeglasses to hold the HMD 300 to the user's head in the proper position. Alternatively, the HMD may be held in place with straps or other commonly known suitable attachments.

Access points 210, 220 each transmit an RF signal which is sensed by these antennae 301, 303. In this embodiment, at least one Access Point is a wireless router. Each Access Point 210, 220 includes source identification in its signal. This allows the source of a received signal to be determined. Therefore, antenna 301 receives the first signal from the closer Access Point 210, and then receives the second signal from farther Access Point 220.

Similarly, antenna 303 receives the signal from the closer Access Point 220, and then receives the signal from farther Access Point 210. This results in four received signals.

The signals received from antennae 301, 303 are provided to an HMD receiver 320 (FIG. 2) that determines position information. The HMD receiver 320 (also referred to as HMD receiver circuit 320) in this embodiment is built into the HMD 300.

Signals from HMD 300 are provided to the HMD receiver 320. The HMD receiver circuit 320 includes a carrier recovery circuit 330 (FIG. 2) that determines the phase differences between the signals received at the antenna 301 and that received at the antenna 303 for both Access Points 210, 220.

HMD receiver 320 also includes a data processor 339 (FIG. 2) that computes the distances between the RFID tag 601 (FIG. 6) to each of the HMD antennae 301, 303 by analyzing the RF signal's phase differences.

The phase offset information from the phase comparator 335 (FIG. 2) is passed to the data processor 339, which knows the distance between the antennae 301, 303 and calculates the relative distance between each of the AP antennae 210, 220 and each of the HMD antennae 301, 303. In this embodiment, the difference in the time of flight (TOF) of the signals is used to determine relative distances. Additional information is required to uniquely identify the position and orientation of the HMD 300.

There is an initial transmission and a return transmission. The initial transmission in this embodiment described above for FIG. 1 has the Access Points 210, 220 initially transmitting to antennae 301, 303, which are each connected to a transceiver on HMD 300. Each transceiver on the HMD 300 creates a signal that is broadcast and sensed by the Access Points 210 and 220. Therefore, Access Point 210 receives a signal broadcast from antenna 301 and 303. Access Point 220 receives the signal broadcast from antenna 303 and that broadcast from antenna 303. The signal from antenna 301 has an embedded ID indicating that it came from antenna 301, while the signal from antenna 303 has an ID embedded in it which identifies that it came from antenna 303. A data processor 340 is in communication with the Access Points 210, 220. By comparing the transmitted signal received from each transceiver one can determine the phase offset that indicates the difference in distance the signals traveled.

In an alternative embodiment, one can measure the total time it took from sending the initial signal to receiving the response (time-of-flight, "TOF"), taking into account how long it takes the responding transceiver to make a response. The difference in the TOF of the signals from Access Point 210 to antenna 301 and 303 indicates the relative difference in these distances. And similarly, the difference in TOF of the signals from Access Point 220 to antennae 301, 303 indicates their relative distances.

Even though this was described as the Access Points 210, 220 initiating the transmission and then processing the received signal, the situation may be reversed in which the HMD antennae 301, 303 broadcast an initial signal which is received by the Access Points 210, 220. These Access Points 210, 220 then respond by broadcasting a signal which is received by antennae (and their associated transceivers, not shown).

These broadcast signals are then received and processed by electronics in the HMD 300 to determine the distance of each antennae 301, 303 to each of the Access Point antennae 211, 221.

It is understood that all equipment required to process the signal and determine distances may be present in both the HMD 300 and Access Points 210, 220, which also determines the position and orientation of the HMD 300 relative to the Access Points 210, 220.

The position and orientation information of the HMD 300 are then provided to a VR system (or AR system) 250. This may be by a communication link which preferably employs the existing transmitters and receivers. A transmitter-receiver device may be referred to as a "transceiver". The position information is important in defining the viewpoint used to generate the images provided on display 309. VR system 250 employs at least one processor 251 coupled to memory 253. Memory has pre-stored executable instructions 255. Memory is also used for storage of other information 257.

Throughout this description, reference will be made to mobile devices, including specifically an HMD 300. For purposes of this disclosure and as described below in more detail, the mobile devices are not limited to an HMD 300, but could be virtual or augmented reality glasses, robots, drones, vehicles, handheld communicators, scanners, or any device with radio frequency (RF) communication capability. Similarly, those of ordinary skill in the art will recognize that the Access Points may be any type or number of devices at known locations transmitting a multifrequency RF signal with coordinate information.

HMD Receiver

Figure 2:
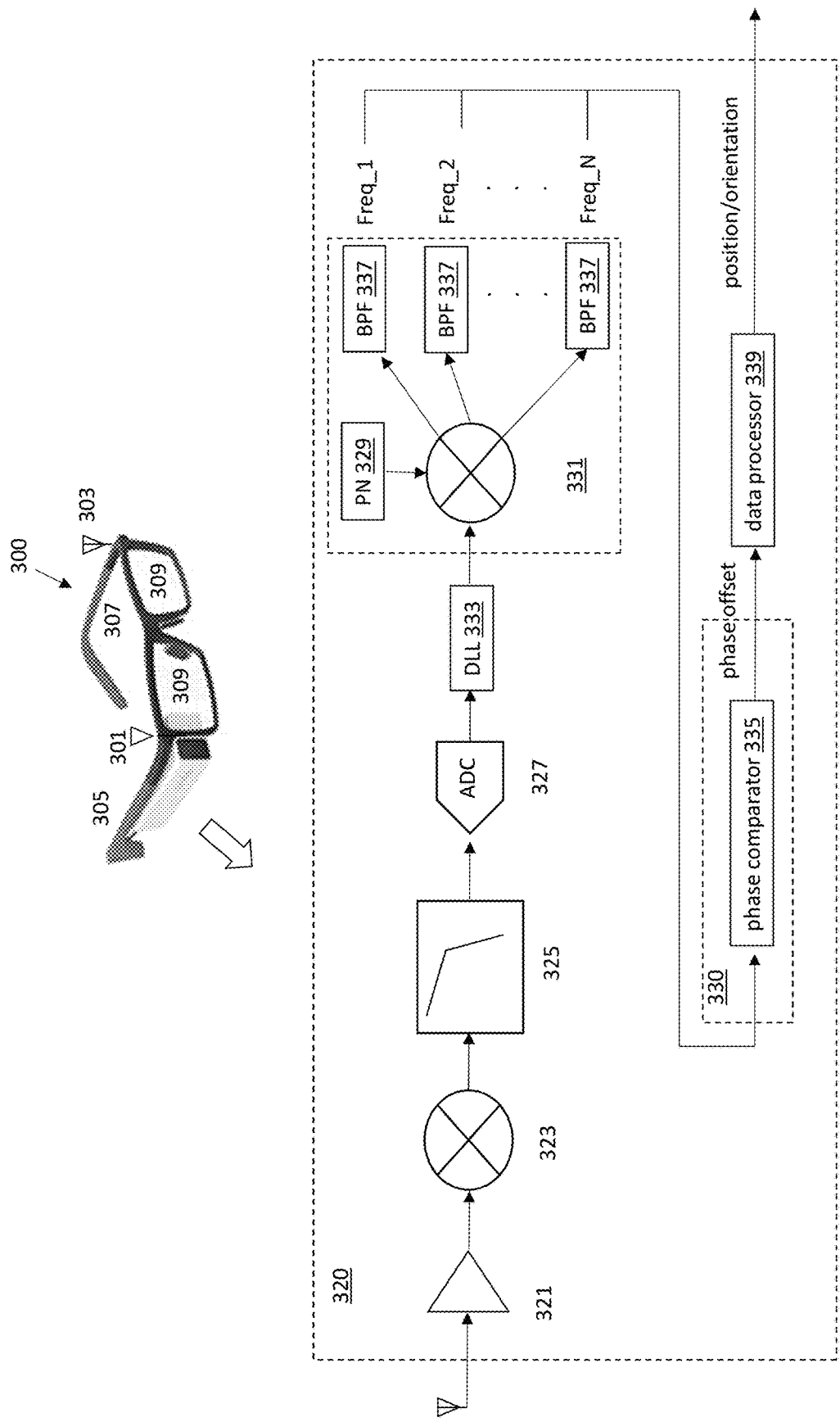
FIG. 2 is a schematic illustration of elements of an embodiment of an HMD receiver.

FIG. 2 shows an HMD receiver 320 capable of independently processing at least two channels of signals, one for the signals received by antenna 301 and the other for signals received by antenna 303 at the HMD 300. In this embodiment, the phase differences of arrival (PDOA) of multifrequency signals sent from Access Point 210, 220 to HMD 300 are used to make range measurements through time of arrival calculations. In this example, the individual antenna receiver channels of HMD receiver 320 independently determine a phase relationship from the multifrequency transmission(s) sent from each Access Point 210, 220. The phase difference measurements are then used to determine time of arrival of the signals sent from the Access Point as they are received by the HMD antenna, and the time of arrival information is then used to determine the distances between antennae 301, 303 and Access Points 210, 220. In some embodiments, phase differences of arrival (PDOA) data of multifrequency signals are exchanged between Access Point 210, 220 and HMD 300.

In one embodiment for determining phase information, each receive channel of HMD receiver 320 may be comprised of an antenna 301,303 coupled to an amplifier circuit 321 to amplify the received signal.

The amplifier circuit 321 is coupled to a down-converter 323 to bring the frequency of the signal down to a frequency that can be processed.

Down converter 321 provides the down-converted signal to a filter which passes a signal band that is to be processed.

An analog-to-digital converter (ADC) 325 receives the filtered signal, samples the signal, digitizes the samples and provides them as a stream of digital information.

Each Access Point 210, 220 transmits signals with a specific and known PN code, which is then used by the receiver to de-spread the signal. A digital signal processor 331 is coupled to the ADC 327 and separates out signals on multiple frequency bands using band pass filters 337. This may be done by deconvoluting the signal with a particular pseudo-noise (PN) sequence code from a pseudo noise generator (PN) 329.

The system may employ a delay locked loop (DLL) 333 to synchronize with the signal. After the synchronization has occurred, parallel digital filters may be used to separate out multiple frequency components from the signal.

After separating out the frequency components, the phase of each component is extracted and compared using a differential phase comparator 335.

Each frequency band may include a separate set of information. For example, frequency band Freq_1 may include information relating to the signal received by HMD antenna 301, which was transmitted from Access Point 210.

Similarly, Freq_2 could have information relating to the signal received by HMD antenna 303, which was transmitted from Access Point 220.

The digital information on the various frequency bands Freq_1, Freq_2 ... Freq_N can be used to calculate various times of arrival of the signals, various distances and ultimately, the relative position and orientation of the tracked object.

The data processor 339 then utilizes the phase information to calculate several ranges and then the location and orientation of the HMD from the ranges. One possible technique for calculating range based on multifrequency phase differences from a single transmission source is described in detail in the abovementioned paper "Multifrequency-Based Range Estimation of RFID Tags" (2009, IEEE, by Xin Li), and is hereby incorporated by reference as if set forth in its entirety herein.

The relative positions of two antennae with respect to each other are known. In FIG. 1, antennae 301, 303 are fixed to the HMD approximately 5 inches apart and on a common plane for ease of understanding. The extracted phases are utilized to determine four distances, being that between each HMD antenna 301,303 and each Access Point 210,220. Using this information, the relative position and orientation of the HMD antennae 301, 303 relative to the Access Points 210, 220 within a 2-dimensional plane can be determined.

In this first embodiment of FIG. 1, if the wireless Access Point 210 has a known absolute location (X, Y, Z, or any other coordinate system) with respect to a universal coordinate system, the absolute position and location within a 2-dimensional plane may be determined. This physical location is broadcasted as part of, or in addition to, the multiple frequency RF signal sent from the Access Points 210, 220. Similarly, the other Access Points also may transmit their absolute locations.

The use of a system employing a single Access Point may be acceptable in certain applications. For example, if one only requires to measure a distance from the Access Point 210 to an HMD 300, a single Access Point would be adequate. However, it is often desired to precisely determine and track the location and orientation of a mobile device, such as HMD 300. In this case, multiple Access Points would be required.

The present system provides improved location accuracy if there are two Access Points, as shown in FIG. 1, as opposed to a single Access Point. In such a setup, the HMD 300 uses both antennae 301, 303 to determine the distance to the two Access Points 210, 220 as described above based on PDOA and/or PDOD information. Each Access Point 210, 220 has a unique PN code that identifies its RF multifrequency signals. Since the antennae 301, 303 have a known spatial separation and the orientation can be determined with motion sensors, the position of the HMD 300 can be determined.

The distance from the Access Points 210, 220 to each HMD antenna 301, 303 is calculated using time of arrival information using PDOA information from the dual or multi frequency signal transmitted by the Access Points 210, 220 and/or PDOD information exchanged between an HMD antenna 301, 303 and the Access Points 210, 220.

In this case, the two-dimensional (2D) position of the HMD 300 cannot be determined using only two Access Points 210, 220. Since these determine distance from the transmitter in any direction, the possible solutions for a single distance result in a circle around the transmitter. When this process is repeated for a second Access Point, there are now two solution circles that intersect at two locations. This results in two possible solutions. However, once the HMD starts moving, the heading and orientation of the HMD 300 can be utilized to reduce the solution space to a single solution and determine the position of the HMD 300.

In order to calculate the orientation of the HMD 300, in addition to its 2D position, requires an additional Access Point. Trilateration can be performed using the known position information of the two Access Points 210, 220 and position of the HMD antennae 301, 303 as calculated relative to the Access Points 210, 220. For determining 3D position without having motion/orientation sensor information, it is preferred to have four Access Points 210, 220, etc. to perform multi-lateration and accurately determine the position of the HMD 300.

Assuming that the location of each wireless Access Point 210, 220, ... is transmitted to the HMD, the precise location and orientation of the HMD 300 is now calculable. It will be recognized that further Access Points providing additional multifrequency RF signals incorporating their known positions will further improve system accuracy and resiliency. For system cost reduction, it may be a desirable design choice for multiple transmitters to share a single processor that generates the multifrequency RF signals and unique PN identifier code for each Access Point.

For AR applications, accuracies of less than 5 mm. and orientation headings of less than 0.2 degrees are desired. Otherwise, the objects coincide depending on the distance of the object to the viewer. If the object is far away, small orientation errors (<1 degree) will cause the object to move in respect to its background, and for objects that are close to the viewer small errors in position (<1 cm.) will cause the object to move, thus, degrading the AR experience.

To acquire accuracies that are less than a few inches in AR applications, the system improves accuracy using image processing techniques that reduce the computational burden by locking an object's shape and color contrasts. It can also approximate an object's motion in space. For example, the software can perform smoothing of object movement by causing displayed images to move in curves or lines, rather than in a jerky or jittery motion. Various other image-processing techniques can be utilized to improve image presentation.

Figure 3:
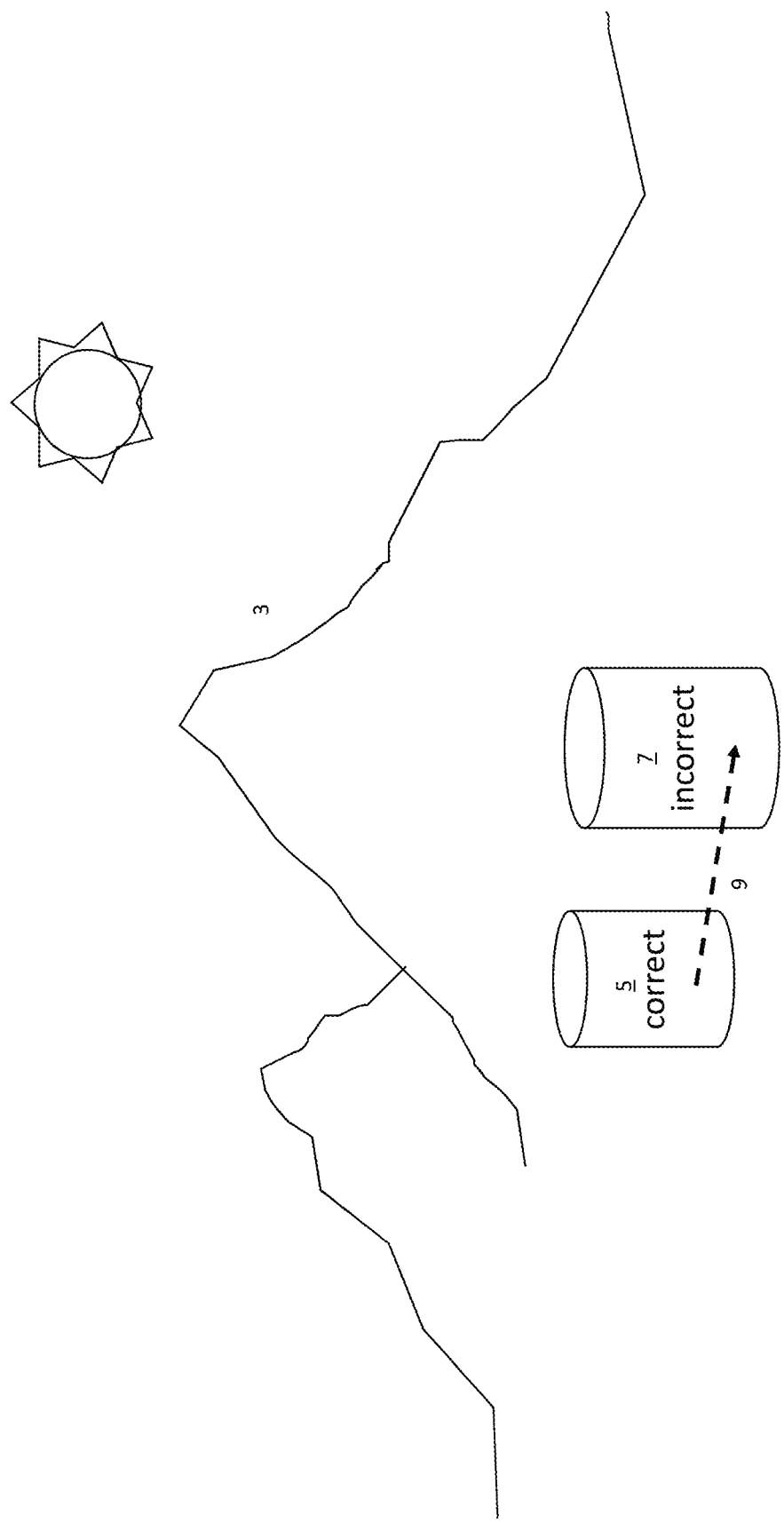
FIG. 3 is a diagram illustrating how inaccurate tracking can lead to image distortion in virtual reality systems.

For example, as seen in FIG. 3, an object, such as a cylinder 5 may sit in front of a mountain 3 (real or virtual). If the cylinder 5 is being tracked and does not move for a period of time, any motion of the object detected when the viewpoint changes, may be rejected or "smoothed" and no object motion would be displayed. The cylinder 5 is thus biased as locked in place relative to other objects in the image unless motion is repeatedly verified over time or verified by multiple Access Points.

At system start-up, a Mobile Device, such as HMD 300 in this example, may be put into a precise known position and orientation relative to the Access Points and the difference between the HMD's calculated position and known position are determined as the calibration error. The system is then adjusted to compensate to use the offset error in calculations to more accurately determine positions.

Motion and orientation sensors may be employed to supplement tracking, as indicated above.

Figure 4:
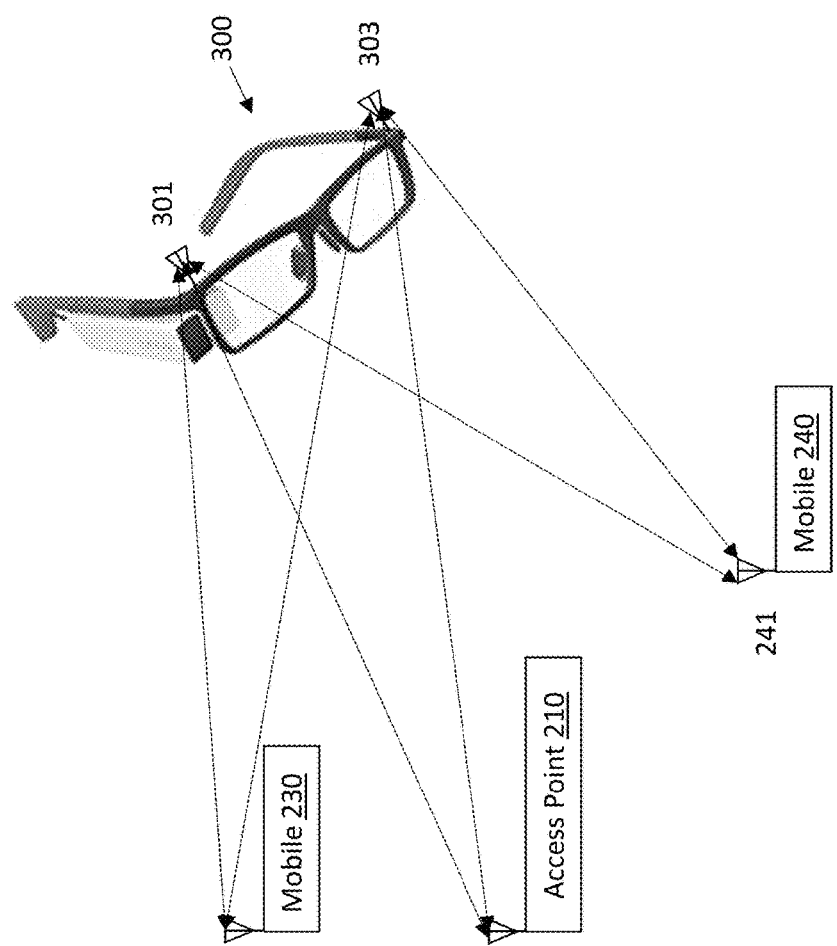
FIG. 4 is an illustration of the use of mobile devices to create more accurate location determinations.

FIG. 4 shows another embodiment of the tracking system according to the present disclosure that utilizes a variety of transmitters 210, 230, 240 to fix either relative position or absolute position of a tracked device, here being HMD 300. The system may adjust to function as several different embodiments.

First Embodiment

In the embodiment shown in FIG. 4, multifrequency RF signals and location information are sent from an Access Point 210 (as described above) and a stationary mobile transmitter 230 (such as a cell phone). The HMD 300 uses the phase difference of arrival relationships from the multifrequency signals received from both the Access Point 210 and the mobile transmitters 230, 240 to determine the locations of HMD antennae 301, 303. In this embodiment, the mobile device transmitter 230 acts much like the second Access Point. More specifically stated, once the Mobile Device 230 location is identified accurately, it transmits multifrequency RF signals and its location to the HMD 300. The distance information from the HMD 300 to the Mobile Devices 230, 240 and Access Point 210 are used to accurately determine the HMD's 300 relative position. Adding the known position of stationary mobile transmitter 230 to the positions relative to mobile device 230 results in absolute positions.

The location of the Mobile Device 230 may be determined in a variety of ways. Preferably, however, the Mobile Device 230 independently determines its position using phase difference of arrival from multifrequency signals from the Access Point 210 (or Multiple Access Points), such as described above. Alternatively, the location of the Mobile Device 230 may be tracked by a networked system by transmitting a signal to a plurality of receivers at fixed locations, such as described in U.S. Pat. No. 8,749,433.

A receiver would then calculate the PDOA either at each Access Point (if Mobile Device sends multifrequency RF signals) to calculate TOA information or by comparing the Mobile Device RF signal's phase at each Access Point to calculate time difference of arrival (TDOA) information. In both approaches, distances are used to perform multi-lateration calculations to determine the position of the Mobile Device and report it back to the Mobile Device. In some embodiments, transceivers or combinations of transmitters and receivers, e.g., transceivers having a combination of signal transmitters and receivers, are used to determine and exchange time difference of arrival (TDOA) and/or time difference of departure (TDOD) information between the Mobile Device 230 and Access Point 210. In some embodiments, referring to FIG. 7, an antenna 301 can operate as a receiver and/or transmitter, i.e., to send transmit info to the tag 610 for determining TDOD. In TDOD, for example, anchors only transmit and tags only receive and calculate their positions from TDOA.

Determining mobile device position to an accuracy of a few inches or better is needed to enable effective HMD VR or AR functionality. In addition to VR and AR functionality, certain applications for HMDs or other mobile devices require high resolution, highly accurate position tracking functionality. Using phase as a means to extract signal timing information for position detection is an effective means to meet these accuracy requirements.

Networked Tracking

As will be recognized by one of ordinary skill in the art, each transmitter that is being controlled to broadcast a known position using multiple frequency RF signals to another device coupled to a device which has decoding capabilities potentially can calculate distances between the receiving device and the transmitter. Then, each mobile device, such as a radio-frequency identification (RFID) tag that is running software or is otherwise controlled in the proper manner, that has a known position and is stationary (at least for a period of time) can further serve as a reference point, mimicking the function of an Access Point, providing position information to other devices that communicate with it. Therefore, by loading the proper software on such devices, they can create a evolving mesh network of shared position information that will increase geographic coverage and improve location accuracy without requiring additional network hardware such as Access Points.

Automobile Position/Direction Determination

Figure 5:
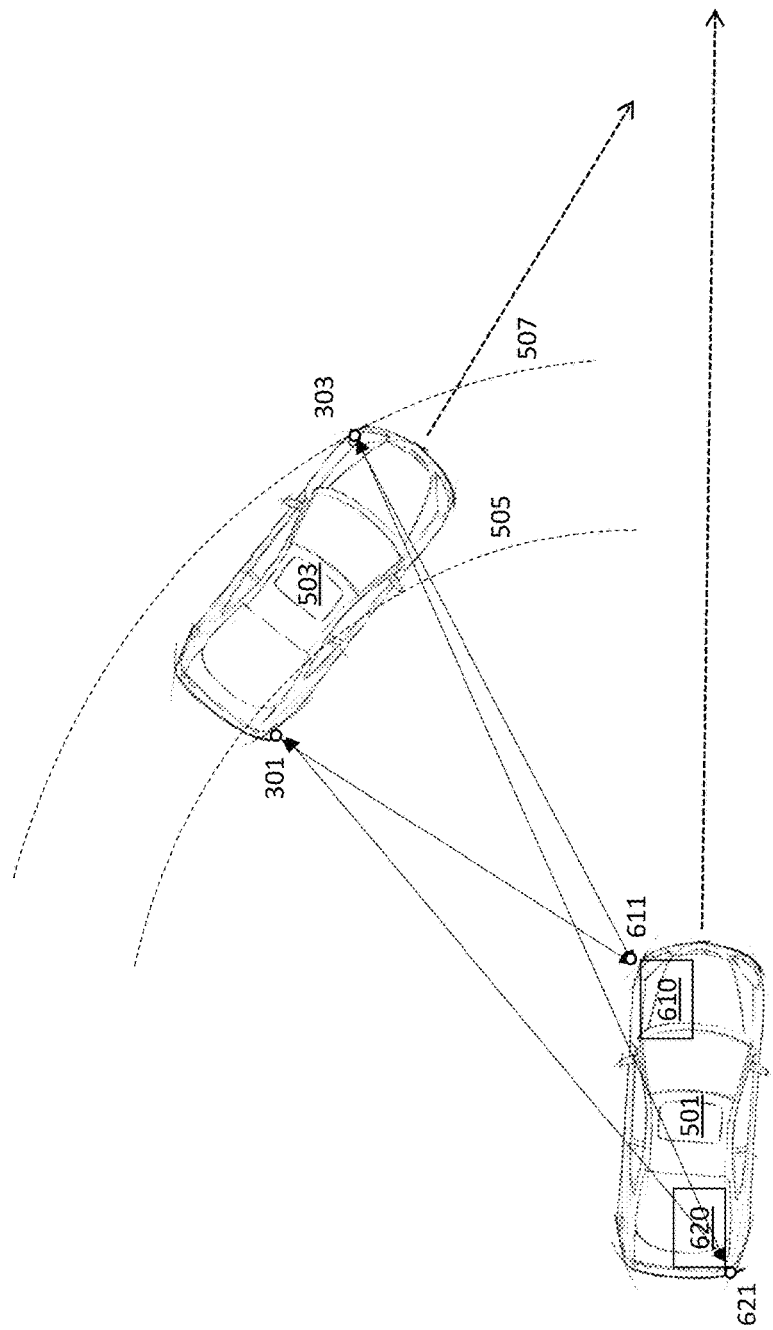
FIG. 5 is an illustration of the use of the tracking system implemented in two different automobiles to predict and prevent collisions.

The systems described above may be implemented for various uses. For example, assume the Access Point 210 in FIG. 5 is in the driver's front corner of an automobile ("first car") 501, and that this automobile is GPS enabled. The automobile 501 has Tags 610, 620 that transmit multifrequency RF signals and location information from antennae 611, 621, consistent with the description above. In some embodiments, the Tags 610, 620 can receive RF signals from the HMD antennae 301, 303, for example, according to a TDOD scheme.

A driver in a second car 503 may be wearing an HMD 300 with HMD antennae, or alternatively, may have antennae 301, 303 attached to various parts of the automobile. In this embodiment, they are at the driver's front corner, and the passenger's rear corner of the automobile 503. These multiple antennae 301, 303 are coupled to a processor (not shown) running executable code that perform the tracking functions as described herein. Transceivers connected to antennae 301, 303 receive the multifrequency RF signals transmitted from Tags 610, 620 and transmit signals back to antennae 611, 621. The attached processor in car 501 calculates position and location information based on Time of Arrival information and multi-lateration calculations. In alternative embodiments, the transceivers can transmit signals to Tags 610, 620, which receive and calculate their positions according to TDOD or PDOD schemes.

Based on this position information from the second car 503, the system of the first car 501 may determine the speed and projected path of the second car 503. A warning may be issued to the drivers, or in a self-driving or driver-assisted car having a control computer, the computer control, either, or both cars 501, 503 may take evasive measures (braking, turning, etc.) to avoid a collision. It is understood that the situation may be reversed in which the functions described as being performed by automobile 501 may be performed by automobile 503 and vice versa. This embodiment functions in a manner similar to that described in FIG. 6, assuming that FIG. 6 employed two Tags.

It should be recognized that GPS is not the only way to augment the tracking system of the present disclosure. For example, an automobile will commonly include a compass, speedometer, accelerometers and cameras or other sensing devices (radar). These devices may augment the present system of object tracking. For example, a compass and speedometer generally provide bearing and speed. However, driver input may change radically or a car may be moving out of control (i.e., speed and compass are not accurate in a car spinning on ice). In such situations, the present disclosure can augment relative tracking between two or more cars. A second car will have two antennae, and the actual motion of a first car that is transmitting multifrequency signals can be tracked and used to determine if the first car is out of control, getting too close to the first car, etc.

The above descriptions of tracking HMDs is much more broadly applicable when considering that many mobile transmitters and receivers may utilize the present disclosure. For example, the mobile telephone is ubiquitous in the world today, and in the present disclosure, each mobile phone may provide location and tracking services not only to HMDs, but to any other transmitter including other mobile phones, automobiles, scanners, Access Points, etc. Thus, phone-to-phone, car-to-car, phone-to-car are all links that may provide mutual location and tracking services to improve the user experience.

Granularity of Information

In the above embodiments, different aspects of position knowledge are required. Specifically, for an HMD in a virtual reality system, the latency delay in tracking is preferably less than 20 milliseconds. Such can be achieved with a conventional digital signal processor and limited filtering of data.

On the other hand, in the automobile example, location may be determined on a less fine scale and the system may use longer wavelength RF signals that provide greater geographic range, but require larger antennae and result in slower processing speeds. These choices are within the domain of the system designer knowing the utilization parameters (i.e., speed of objects being tracked, tracking accuracy requirement, etc.).

In certain embodiments of the present disclosure, it is important to determine absolute physical location (x,y, or x,y,z position in the physical world). Absolute physical locations are typically identified with respect to a commonly accepted, or a universal reference frame. However, in other embodiments of the disclosure, relative physical location is adequate.

Figure 6:
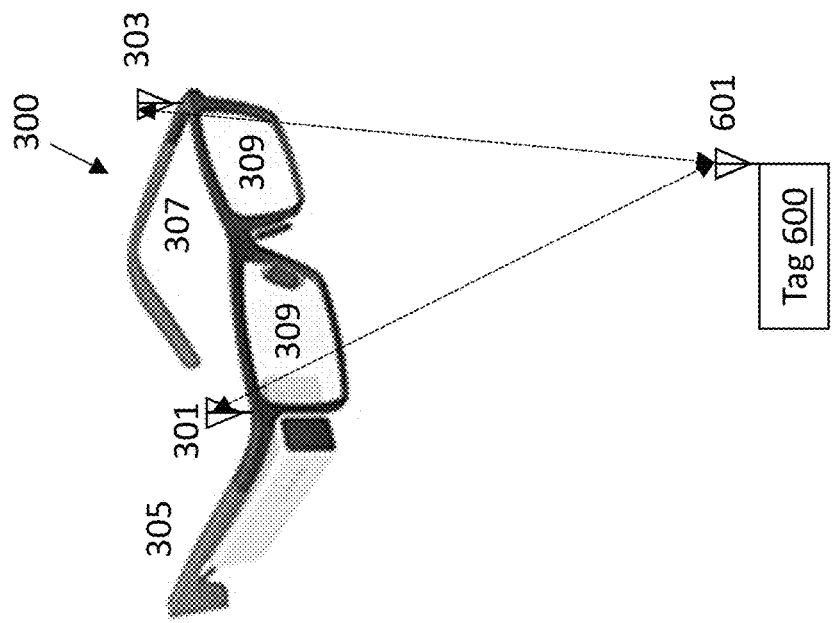
FIG. 6 shows location and orientation determinations for HMD in two dimensions using a single transmitter and two receiving antennae.

FIG. 6 provides another preferred embodiment that does not require determination of the absolute location of the devices, but can function with relative locations. In this embodiment, a receiving device, such as an HMD 300, determines the position, relative to itself, of other transmitting devices, such as an RFID tag 600 that is capable of transmitting dual or multifrequency radio signal information through its RFID antenna 601.

Signals from HMD 300 are provided to an HMD receiver 320. HMD receiver 320 passes the signals to a carrier recovery circuit 330 that may include a DLL circuit 333 and a phase comparator 335 that determines the phase differences between the received signals. HMD receiver 320 passes the phase differences to a processor 339 that computes the distances between the RFID tag 600 to each of the HMD antennae 301, 303.

This calculation is described above with relation to the HMD calculating its 2-D position relative to the RFID tag 600. In such a system, it would not be possible to determine HMD's 300 absolute position from RFID tag 600 that has unknown positions.

Figure 7:
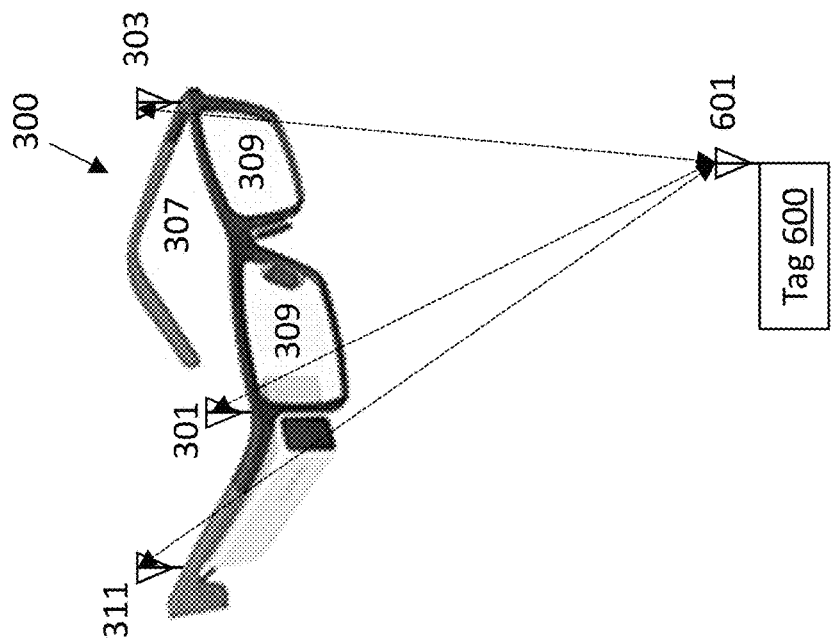
FIG. 7 shows location and orientation determinations for the HMD in three dimensions using a single transmitter and three receiving antennae in different planes.

FIG. 7 shows a simple configuration for determining the relative three-dimensional position of an RFID tag 600 relative to the HMD 300. In this embodiment, RFID tag 600 transmits a dual or multifrequency signal and an identification code that is received by at least three HMD antennae 301, 303, 311 placed on or embedded in the HMD 300. These HMD antennae 301, 303, 311 could be placed at the end pieces of the HMD.

In this embodiment, one HMD antenna would compare the phase difference of arrival of the Tags' dual-frequency signal as it is received at each HMD antenna. This received dual-frequency signal phase difference information sent from the RFID tag 600 and received at the individual HMD antennae 301, 303, 311 are then used to determine distances between the RFID tag 600 and each HMD antenna 301, 303, 311. The three distances as determined between each HMD antenna 301, 303, 311 and the RFID tag 600 as well as the antennae's known relative separation from each other and positions on the HMD 300 allows the system, through trilateration or multilateration techniques, to determine the locations of the three HMD antennae 301, 303, 311 relative to the RFID tag 600. These three points define a plane which defines the position and orientation of the HMD 300 in space.

To improve tracking of the relative position of the Tag, motion sensors that may be inside or on the Tag could be utilized to determine the Tag's orientation and acceleration, and then combined with range determined by RF.

The system in FIG. 7 may be utilized with or without knowledge of the exact position of the HMD. In the latter case, the position of the single or multiple RFID tags 600 that are tracked by the HMD 300 may all only be related to the HMD 300. This allows full functionality in a virtual reality environment where HMD 300 and/or RFID tag 600 absolute position detection is not required.

Alternatively, the position of the HMD 300 may be tracked such as is described above with the use of Access Points 210, 220 . . . , and the relative position of the RFID tags 600 may also be derived based on their relative location to the HMD 300. This is more beneficial in an augmented reality system.

Consider the two vehicles 501, 503 of FIG. 5, each configured with one or more RF transmitting antennae, at least three receiver antennae that receive RF signals transmitted by the other vehicle, receiver circuitry for processing the received RF signals and computing timing information, and a processor programmed to determine, from the timing information obtained from the receiver circuitry, a relative distance of that vehicle from the other vehicle. The receiver antennae of each vehicle are disposed at fixed locations at that vehicle, with the layout (i.e. spatial separations) of the receiver antennae being known and stored in memory accessible to the processor. Depending upon the particular embodiment, the one or more RF transmitting antennae can transmit a single frequency, a dual frequency, or a multi-frequency RF signal. The receiver circuitry can use any one of a variety of methods described herein to acquire timing information from the RF signals received by the vehicle's receiver antennae, including time of arrival, time difference of arrival, and phase difference of arrival.

Although drawn as automobiles, the vehicles 501, 503 can be other types of conventional terrestrial vehicles, such as trucks, trains, bicycles, or airborne vehicles, such as airplanes, drones and spacecraft, or similar mobile vehicles or equipment, including robots. Such vehicles may be manned or unmanned, autonomously driven or driver-assisted. Each vehicle may be moving while their processors are calculating the positions of the other vehicles, relative to its own vehicle, in real time.

Moving or stationary vehicles may also receive radio signals from a stationary object, such as a sign post, a mile marker, a utility pole, or guardrail, configured with an RF signal transmitter. A vehicle can determine its own relative location in relation to the absolute terrestrial location of the stationary object from the object's RF signals and the known terrestrial position of the object. The known terrestrial position of the object can be established through such methods as pre-determined geo-position mapping and active global position system calculations.

In addition, vehicles and stationary objects can be configured with a global positioning system (GPS) device that obtains the absolute global position of that vehicle (or stationary object), which the vehicle or stationary object can include in its RF signal transmissions. The vehicle receiving such RF transmissions thus knows the absolute global position of transmitting antenna and receiver antennae of the vehicle (or the transmitting antenna only in the case of an RF-transmitting stationary object not having any receiving antennae), and can use the absolute global position to supplement its own position calculations.

By computing the location of each other vehicle in relation to other vehicles equipped with a multiple antenna, self-navigation array, or the relative position of each vehicle in relation to RF-transmitting stationary objects, based on RF signals received by its own receiver antennae and on each antenna's known physical position in relation to each other antenna, a vehicle can navigate itself relative to those other vehicles and stationary objects, provide proximity warnings, take collision avoidance actions, or improve its absolute positioning calculations through multiple position points compared to a known physical location enabled by the vehicle's multiple antennae arrangement.

Referring back now to FIG. 1, the HMD 300 is fed information from a software program executing in a VR system 250. The software program may be running locally (i.e., at or near the HMD 300) or may be streamed to the HMD 300 from a more distant server/processor, such as VR system 250. The software provides images onto the displays 309 viewed by a user through the HMD 300. In an alternative embodiment, the images may be viewed on the screen of a mobile device.

In the present disclosure, an RFID tag may be attached to the user's hand (or on an object held by the user). Such an RFID tag may be represented in a virtual environment generated by the software as a cursor, ball, weapon or other object. Motion of the hand causes motion of the RFID tag. The HMD 300 tracks motion of the RFID tag 600 and the movement of the Tag is provided to the software providing images to the HMD 300. Thus, the software shows accurate movement of the cursor, ball, weapon, or other object representing the RFID tag 600 on the HMD 300. The RFID tag 600 may also include motion/orientation sensors that provide information to the HMD 300 (along with multifrequency signals and Pseudo Noise information) for further improving position accuracy and intuitive interaction by adding orientation sensing with multiple degrees of freedom beyond the positional tracking.

In addition, or alternatively, position information may be displayed if the relative location of RFID tags on a user is known. For example, if two tags were placed on a user's hand, such as one tag on a thumb and one on a pinkie finger, hand orientation may be displayed in a virtual reality environment based on the position of the two tags relative to each other.

In the particular application of the present disclosure that relates to glasses or an HMD type device, further uses are created by the present disclosure. For example, glasses and HMDs often have earbuds or the like. If the location and orientation of the HMD are determined in an augmented or virtual reality system, the user can be cued by auditory or visual input to turn and look in a particular direction. As a specific example, a user wearing virtual reality glasses driving a car (real or virtual) may be looking forward as determined by the HMD orientation. Detecting this orientation, the augmented or virtual reality program may instruct the user through the earbud (or by visual cue) to "look left at an object" and then provide the appropriate vision for the user as the HMD is tracked to move left. Similarly, the system can track virtual reality objects and provide sensory feedback to the user based on their location. For example, if the user fails to move as determined by the HMD tracker, a buzzer on a part of their body could provide feedback that a virtual ball has "hit" the user.

The above embodiment is broadly described relative to augmented or virtual reality systems, and it might be thought limited to very constrained environments. However, the above system can be integrated with other technology. For example, it is recognized that GPS location does not provide the required accuracy in many environments, and especially indoor environments. However, each GPS may transmit and receive RF signals on multiple frequencies and position information to further expand the mesh network of location tracking devices described above. Alternatively, an RFID tag 600 may be connected to a GPS unit (an HMD or drone, for example). In this situation, the location and orientation of the HMD may be added to the location of each GPS unit to provide more accurate location information.

While the absolute position accuracy of the HMD as determined by the GPS unit is less precise than AR or other HMD applications with high accuracy requirements, in certain use cases, such as the case of tracking multiple automobiles described above, this precision may prove adequate. Triangulation of increasing number of GPS-enabled HMDs or similar Mobile Devices could improve absolute location accuracy. In this situation, for example, one precise position location may be derived from an Access Point, and may be communicated to other Mobile Devices. This will greatly improve the entire system's Mobile Device position detection.

More specifically, turning back to FIG. 4, three devices are illustrated: an Access Point 210, two Mobile Devices 230, 240, and an HMD 300. However, as mentioned above with respect to cars, at different times each device may act as a device being tracked or as a tracking device, provided a device has multiple antennae (or an extension providing multiple antennae) when it is being tracked, the ability to emit multifrequency RF signals, and is running the appropriate software when tracking another device.

For example, in FIG. 4 assume that the Access Point 210 is a Mobile phone that has location information (from GPS, user input, a local area network or other source). The Mobile Phone transmits multifrequency RF signals to a second Mobile Device that has multiple antennae and determines its location as described above. The HMD 300 may be a third Mobile Device, which also receives the multifrequency RF signal from the Mobile phone and likewise determines its location. In this embodiment, the additional information is the relative location of the second and third Mobile Devices as determined using the signal from the Mobile phone.

The above system can be improved for accuracy when each Mobile Device augments the calculated position information with other location/orientation information. Thus, if each Mobile Device includes a GPS, the tracking information may be augmented by sharing GPS locators among the three Mobile Devices. This may allow less frequent transmission of multifrequency signals for location tracking to conserve battery power if the tracking application requires less exact position certitude.

Dealing with 'Bad Data'

It should be noted that with mobile devices, position and orientation will change with user movement. Further, a mobile device (or even an Access Point) may be broadcasting "bad" position data either through erroneous calculation or for nefarious reasons. There are multiple ways to address such concerns.

In the case of mobile devices, the mobile device will typically contain multiple options for determining gross or accurate position. GPS can provide gross position information, while the above referenced phase determined TOA, TDOA, and/or TDOD based position calculation systems provide much finer position, and even orientation, detail. Phones often include accelerometers, gyroscopes, accelerometers, and magnetic sensors that may also indicate movement of the mobile device. The central processing unit may be programmed to, for example, cease broadcast of position information if the accelerometer detects movement and the position of that device is unknown due to the movement. Alternatively, one could rely on position movement relative to GPS coordinates to terminate transmission of position information, or a combination of factors may lead to terminating position transmission due to suspected errors. The present disclosure contemplates weighing input from multiple sources to determine if position calculated is accurate. The weight given a position calculation may depend on the perceived credibility of the information source. For example, if a GPS signal indicates a gross position miscalculation and only one Access Point is available, the device may reject the Access Point information. Alternatively, if multiple trusted Access Points are designated as trusted position providers and are consistent in their location calculation, but GPS signal is weak or sporadic (indoors for example) the system may reject GPS information entirely.

On the receiving side when determining position location, it is harder to discriminate bad data. However, incorporating RF multifrequency signals and location information from multiple transmitters can provide redundancy for multiple position data points to determine best fits in predictive models and/or for screening position data not correlated to known system transmitter coordinates. One could also append "trusted source" tags to data position so that a user could elect to only use certain RF transmitters when calculating their absolute position.

The present disclosure may incorporate a variety of possible alternative technologies and be used in a broad range of applications. For example, with respect to an inventory tracking system, there are a plurality of objects being tracked, including but not limited to palettes, crates, robots, scanners, people, cartons, boxes, trucks, etc. Some or all of these objects may include location-tracking capability along with identification ability.

Package Tracking

The RF tracking may utilize, for example, a scanner (scanner or reader) to identify and track objects as described in U.S. patent application Ser. No. 14/568,468, filed Dec. 12, 2014, titled "Tracking System with Mobile Reader", the entirety of which is incorporated by reference herein. Objects can be identified and the location of the object associated with the scanner's determined position. In such a system, the present disclosure may utilize any identification means like RFID, barcode, etc. The Scanner may, in one embodiment, be an ultra-wideband system that reads ultra-wide transmitters or transceivers placed on boxes and packages. In such an embodiment, three or four ultra-wideband transceivers may be fixed in at least 3 locations within a package storage area, which may be a cargo area, or a package delivery vehicle. Preferably these locations are in the corners, but may be at other suitably spaced locations.

Each package in the truck with a transmitter or transceiver is uniquely identified and located as detailed above by the antennae in the truck. A GPS is typically available in such vehicles and the GPS may be interfaced to the tracking system. Thus, when the driver arrives at a house/business, the GPS identifies the address and specifies the packages that are to be delivered. The tracking system can determine the location in the vehicle of the objects to be delivered to that address and provide the location of the packages to the driver, thus speeding up delivery. Further, if multiple packages are to be delivered, but the tracking system identifies that only one object is removed from the vehicle, the driver can be notified that another package remains in the vehicle to be delivered to the GPS identified address. This type of geo-fence will greatly improve delivery efficiencies.

Since the transceivers transmit over a transmission region larger than the delivery truck, the system may also track the package as it is being carried outside of the delivery truck, but still within the transmission range.

The present disclosure may incorporate a variety of possible alternative technologies and may be used in a broad range of applications. Each of the objects being tracked may include location tracking capability along with identification or information storage ability. Each object may be identified and the location of the object associated with a Scanner identifying the object. Such a system may utilize any identification or information storage means like RFID, barcode, etc., within the scope of the disclosure.

In such a system, the Scanner may determine the position of objects relative to itself (as in the delivery truck example) and can determine its position using one or more antenna mounted on the Scanner and using multifrequency, ultra-wideband, or similar RF signal transmissions to and/or from one or more Access Points with known position coordinates, as described above with relation to the HMD, and/or with other integrated location identifiers (i.e., GPS). The Scanner can read information from RFID, as well as provide location information to the RFID(s). Thus, it will be noted that, similar to the above description of a HMD or GPS, once a Scanner has calculated its position, it may transmit RF signals or other means to deliver data with identifier information and its physical location. Other devices receiving these signals may now calculate their own physical position using the Scanner and other objects' or Access Points' position data.

In an alternative embodiment, an object may need power to provide a signal indicating its location. In which case one could provide power to the device by immersing it in a wireless power field (i.e., Magnetic Resonance, Inductive, time-changing magnetic field, etc.). In such an embodiment, when a device (such as a package) enters a power field, the electronics in the package can 'power up' and then communicate with other devices and/or a host system using the same transmitting techniques described in this disclosure.

In one embodiment, a Scanner is utilized to record and store object information and location at which the product was scanned, as shown in above referenced in U.S. patent application Ser. No. 14/568,468. That object will transition through a plurality of facilities such as manufacturing, processing, storage, transportation and retail. Each time the product is scanned, the object information and scan location are read as described in the cited application. However, as shown in FIG. 2, if the package has the proper circuitry to respond to a wireless power field, as the package passes a power field, the electronics on the package (that provide the package's identification and related information) could receive power and transmit the information and/or their location.

In one such embodiment, a package of a perishable material has an RFID chip on it that records temperature. Such are sold by AlienTechnology.com or Zebra.com. When placed in range of a wireless transmitter sending multifrequency signals, the RFID can power up, record the temperature and transmit this information. Note that some systems are battery powered for automated, intermittent temperature recording. In such a system, all recorded temperatures may be transmitted by the RFID on power up. In such a system, any wireless receiver in range of the RFID tag now has two pieces of information: the recorded temperature and a general location of the RFID device. In some systems, this may be adequate, but in a preferred embodiment, the location of the RFID tag would be determined as described above by using multiple receivers to trilaterate or triangulate the tag position. One of ordinary skill in the art will recognize that although RFID and barcode technology are commonly used today to store item identification and/or information, other technologies or protocols for data storage and transmission may be used in the present disclosure.

One of ordinary skill in the art will recognize that the relative fixed locations of the antennae in a device are within the discretion of the system designer. For example, in the HMD example provided above the antennae were stated to be placed 5 inches apart on a plane. In the truck example, the antennae were placed in corners of the vehicle cargo bay. However, the distance and location can be chosen by the designer to optimize the ability of the objects to be located and/or to further track other transmitting devices (Tags, RFID, etc.).

One of ordinary skill in the art will recognize that a variety of wireless transmitters and receivers may be used in the present disclosure. For example, the position of the HMD may be determined relative to transmitted RF signals using varying combinations of tags, mobile devices or fixed devices (routers, hubs, Access Points, etc.) using a variety of communication protocols (Bluetooth, 802.XX, WLAN, ultra-wideband (UWB) and others).

In one embodiment, connecting two or more of the receiver antennae to a single receiver channel provides a major cost savings in hardware and limits circuit board space required by an HMD. In this example, one receiver channel would be used for both receiver antennae on the HMD. To enable this function, we employ a multiplexing technique that will allow the receiver channel to multiplex between each HMD antenna after extracting the PDOA data from the signals sent from the Access Points communicating with each antenna. To accomplish this multiplexing feature, our single (for both antennae) receiver channel would also include a multiplexing switch (MUX), connected to each of the HMD antennae through an electrical connection that will toggle between each antenna.

In an alternative embodiment, there are several nodes set up in spaced locations throughout a building, such as their office or home in which the nodes know their locations. There are several devices which are portable that have the logic of the current invention built into them. These may be tablets, laptops, smartphones and other mobile computing devices which are capable of Wi-Fi, cellular, and Bluetooth, RFID and near-field communications. The current invention may use any of these communication modes as long as the receivers are also capable of receiving these communication modes.

Therefore, the system may have nodes set up to periodically listen for communications from different transmitting devices in an area, such as the building. The nodes then interact with that portable device and with other local nodes to determine the location of the portable device. They also acquire the ID of the portable device and transmit the information along with a time stamp, node to node to an uplink node, through a network to a server where the information is stored in a table. If the portable device is picked up and moved, the system performs the same functions and updates its locations and time stamp in the table. This therefore keeps the last known location of portable devices along with the timestamp.

A user will set up multiple devices this way, such as the laptop, cellphone, tablet, etc. Also, for objects which do not have a built-in transmitter/receiver, a tag can be attached to it, or built into it. For example, the user's keys may have a tag and a unique ID; his wallet can have a tag and unique ID, etc. The user can then look to the table on the server and find the last known location of all of his objects.

In an alternative embodiment, there are several portable objects lying around at various locations in the building within the range of a number of nodes. Think of these as your cellphone, wallet, laptop, keys, etc. These portable objects either have the capability to transmit and receive in several of the communication modes described above, or have a tag attached to them that has these capabilities. If the portable object is within an area to contact at least 4 other transmitters, one of which knows its location, the portable device can determine its location.

A user has a wearable device, or a tag with similar capabilities attached to him/her. As the user moves around the building, the attached tag listens for transmissions from the portable devices, communicates with them to acquire their ID and location. If the portable device is not within an area to determine its location, it may use the tag on the user to determine its location. The information may then be passed back to an Uplink Node, network and server to be stored.

In an alternative embodiment, the user's tag may be the device which stores the location, timestamp and ID of all portable objects so it always has the last known location of all portable devices.

As will be appreciated by one skilled in the art, aspects of the systems described herein may be embodied as a system, method, and computer program product. Thus, aspects of the systems described herein may be embodied in entirely hardware, in entirely software (including, but not limited to, firmware, program code, resident software, microcode), or in a combination of hardware and software. All such embodiments may generally be referred to herein as a circuit, a module, or a system. In addition, aspects of the systems described herein may be in the form of a computer program product embodied in one or more computer readable media having computer readable program code embodied thereon.

Any combination of one or more computer readable medium(s) may be utilized. The computer readable medium may be a computer readable signal medium or a computer readable storage medium. The computer readable medium may be a non-transitory computer readable storage medium, examples of which include, but are not limited to, an electronic, magnetic, optical, electromagnetic, infrared, or semiconductor system, apparatus, or device, or any suitable combination thereof.

As used herein, a computer readable storage medium may be any tangible medium that can contain or store a program for use by or in connection with an instruction execution system, apparatus, device, computer, computing system, computer system, or any programmable machine or device that inputs, processes, and outputs instructions, commands, or data. A non-exhaustive list of specific examples of a computer readable storage medium include an electrical connection having one or more wires, a portable computer diskette, a floppy disk, a hard disk, a random access memory (RAM), a read-only memory (ROM), a USB flash drive, an non-volatile RAM (NVRAM or NOVRAM), an erasable programmable read-only memory (EPROM or Flash memory), a flash memory card, an electrically erasable programmable read-only memory (EEPROM), an optical fiber, a portable compact disc read-only memory (CD-ROM), a DVD-ROM, an optical storage device, a magnetic storage device, or any suitable combination thereof.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. As used herein, a computer readable storage medium is not a computer readable propagating signal medium or a propagated signal.

Program code may be embodied as computer-readable instructions stored on or in a computer readable storage medium as, for example, source code, object code, interpretive code, executable code, or combinations thereof. Any standard or proprietary, programming or interpretive language can be used to produce the computer-executable instructions. Examples of such languages include C, C++, Pascal, JAVA, BASIC, Smalltalk, Visual Basic, and Visual C++.

Transmission of program code embodied on a computer readable medium can occur using any appropriate medium including, but not limited to, wireless, wired, optical fiber cable, radio frequency (RF), or any suitable combination thereof.

The program code may execute entirely on a user's device, partly on the user's device, as a stand-alone software package, partly on the user's device and partly on a remote computer or entirely on a remote computer or server. Any such remote computer may be connected to the user's device through any type of network, including a local area network (LAN) or a wide area network (WAN), or the connection may be made to an external computer (for example, through the Internet using an Internet Service Provider).

Additionally, the methods described herein can be implemented on a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, or the like. In general, any device capable of implementing a state machine that is in turn capable of implementing the proposed methods herein can be used to implement the principles described herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or a VLSI design. Whether software or hardware is used to implement the systems in accordance with the principles described herein is dependent on the speed and/or efficiency requirements of the system, the particular function, and the particular software or hardware systems or microprocessor or microcomputer systems being utilized. The methods illustrated herein however can be readily implemented in hardware and/or software using any known or later developed systems or structures, devices and/or software by those of ordinary skill in the applicable art from the functional description provided herein and with a general basic knowledge of the computer and image processing arts.

Moreover, the disclosed methods may be readily implemented in software executed on programmed general-purpose computer, a special purpose computer, a microprocessor, or the like. In these instances, the systems and methods of the principles described herein may be implemented as program embedded on personal computer such as JAVA® or CGI script, as a resource residing on a server or graphics workstation, as a plug-in, or the like. The system may also be implemented by physically incorporating the system and method into a software and/or hardware system.

While the aforementioned principles have been described in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. A reference to a particular embodiment within the specification do not necessarily all refer to the same embodiment. The features illustrated or described in connection with one exemplary embodiment may be combined with the features of other embodiments. Accordingly, it is intended to embrace all such alternatives, modifications, equivalents, and variations that are within the spirit and scope of the principles described herein.

What is claimed is:

1. A network comprising:
   a network apparatus constructed and arranged for each of a plurality of vehicles in radio frequency (RF) communication with each other, the network apparatus comprising:
   at least one transceiver configured to exchange RF signals with another transmitting or receiving device and to determine timing information from the acquired RF signals;
   memory storing information related to fixed distances between the at least one first transceiver and the other transmitting or receiving device;
   a processor coupled to the memory to access the stored information related to the fixed distances, and to receiver circuitry of the at least one transceiver to receive the timing information determined from the RF signals, the processor being configured to determine a relative position of the vehicle with respect to a receipt of the RF signals based on the stored information related to the fixed distances between each of a plurality of spatially separated antenna and on the timing information determined by the receiver circuitry; and
   a control system configured to control operation of the vehicle in response to the relative position of the vehicle, determined by the processor.

2. The network of claim 1, wherein each vehicle further comprises a global positioning system (GPS) device configured to obtain an absolute position of at least one RF transmitting antenna of that vehicle.

3. The network of claim 2, wherein the processor of each vehicle is configured to direct the at least one RF-transmitting antenna of that vehicle to include the absolute position of that vehicle in RF signals transmitted by that at least one RF-transmitting antenna.

4. The network of claim 2, wherein the receiver circuitry of each vehicle is configured to receive RF signals across a wide band of frequencies and to detect a frequency at which the at least one RF-transmitting antenna of the one or more other vehicles of the plurality of vehicles are transmitting, and is communication with the processor of that vehicle to identify this frequency.

5. The network of claim 4, wherein the processor of each vehicle is configured to direct the at least one RF transmitting antenna of that vehicle to transmit RF signals at the frequency identified by the processor of that vehicle.

6. The network of claim 1, wherein at least one vehicle of the plurality of vehicles is unmanned and autonomously driven.

7. The network of claim 1, wherein at least one vehicle of the plurality of vehicles is a drone or robot.

8. The network of claim 1, wherein at least one vehicle of the plurality of vehicles is a boat.

9. The network of claim 1, wherein the control system of a given vehicle of the plurality of vehicles is in communication with a navigation system of that given vehicle.

10. A method of controlling a vehicle, the method comprising:
    transmitting radio frequency (RF) signals by at least one first transceiver;
    receiving, by a plurality of separated receiver antennae coupled to the vehicle, RF signals from at least one second transceiver coupled to an object;
    determining timing information from the received RF signals;
    storing information related to fixed distances between the least one first transceiver and the at least one second transceiver;
    determining a relative position of the vehicle with respect to the at least one second transceiver coupled to the object based on the stored information related to the fixed distances between each of a plurality of spatially separated antenna and on the determined timing information; and
    controlling operation of the vehicle in response to the determined relative position of the vehicle.

11. The method of claim 10, further comprising obtaining an absolute position of the at least one first transceiver of the vehicle.

12. The method of claim 11, further comprising including the absolute position of the vehicle in the RF signals transmitted by the at least one first transceiver of the vehicle.

13. The method of claim 10, wherein the vehicle is unmanned, and further comprising autonomously driving the vehicle.

14. The method of claim 10, wherein the vehicle is a drone or robot.

15. The method of claim 10, wherein the vehicle is a boat, and the object is a stationary object.

16. The method of claim 10, further comprising:
    receiving, by the separated receiver antennae coupled to the vehicle, RF signals across a wide band of frequencies;
    detecting a frequency at which the at least one second transceiver of the object are transmitting; and
    identifying this frequency.

17. The method of claim 16, further comprising transmitting, by the at least one first transceiver of the vehicle, RF signals at the identified frequency.

18. The method of claim 10, further comprising:
    acquiring from the RF signals received from the at least one second transceiver coupled to the object an absolute global position of the object; and
    determining an absolute global position of the vehicle based on the determined relative position of the vehicle with respect to the at least one second transceiver of the object and the absolute global position of the object.

19. A network system for a vehicle, comprising:
    a network apparatus constructed and arranged for the vehicle in radio frequency (RF) communication with another vehicle, the network apparatus comprising:
    at least one transceiver configured to exchange RF signals with another transmitting or receiving device and to determine timing information from the acquired RF signals;
    memory storing information related to fixed distances between the at least one transceiver and the other transmitting or receiving device;
    a processor coupled to the memory to access the stored information related to the fixed distances, and to receiver circuitry of the at least one transceiver to receive the timing information determined from the RF signals, the processor being configured to determine a relative position of the vehicle with respect to a receipt of the RF signals based on the stored information related to the fixed distances between a plurality of spatially separated antenna and on the timing information determined by the receiver circuitry; and
    a control system configured to control operation of the vehicle in response to the relative position of the vehicle, determined by the processor.

* * * * *